(12) United States Patent
Nakashima

(10) Patent No.: US 12,394,845 B2
(45) Date of Patent: Aug. 19, 2025

(54) BATTERY PRODUCTION METHOD, BATTERY PRODUCTION APPARATUS, AND BATTERY

(71) Applicant: TOYOTA JIDOSHA KABUSHIKI KAISHA, Toyota (JP)

(72) Inventor: Satoshi Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 507 days.

(21) Appl. No.: 17/964,404

(22) Filed: Oct. 12, 2022

(65) Prior Publication Data

US 2023/0122892 A1  Apr. 20, 2023

(30) Foreign Application Priority Data

Oct. 15, 2021 (JP) .................. 2021-169422

(51) Int. Cl.
*H01M 50/169* (2021.01)
*H01M 50/105* (2021.01)
*H01M 50/128* (2021.01)

(52) U.S. Cl.
CPC ........ *H01M 50/169* (2021.01); *H01M 50/105* (2021.01); *H01M 50/128* (2021.01)

(58) Field of Classification Search
CPC . H01M 50/105; H01M 50/128; H01M 50/169
See application file for complete search history.

(56) References Cited

U.S. PATENT DOCUMENTS 8,574,746 B2 * 11/2013 Mizuta ............... H01G 11/18
429/185

FOREIGN PATENT DOCUMENTS

| JP | 2007-200589 A | | 8/2007 | |
|---|---|---|---|---|
| JP | 2017228381 A | * | 12/2017 | |
| JP | 6851131 B2 | * | 3/2021 | .......... H01M 50/186 |
| WO | WO-2017082669 A1 | * | 5/2017 | .......... H01M 50/121 |

* cited by examiner

*Primary Examiner* — Kevin E Yoon
(74) *Attorney, Agent, or Firm* — Dinsmore & Shohl LLP

(57) ABSTRACT

(a) An electrode assembly is accommodated in a laminated casing. (b) A pressure-applied portion is formed by sandwiching at least a portion of a peripheral edge of the laminated casing between a first tool and a second tool. (c) A sealed portion is formed by applying ultrasonic vibration from at least one of the first tool and the second tool to the pressure-applied portion. The first tool includes a projection portion. The second tool is provided with a groove portion. A bending tendency portion is formed in the laminated casing by sandwiching the laminated casing between a tip of the projection portion and a bottom portion of the groove portion. The laminated casing is welded on both sides across the bending tendency portion.

6 Claims, 9 Drawing Sheets

FIG.8
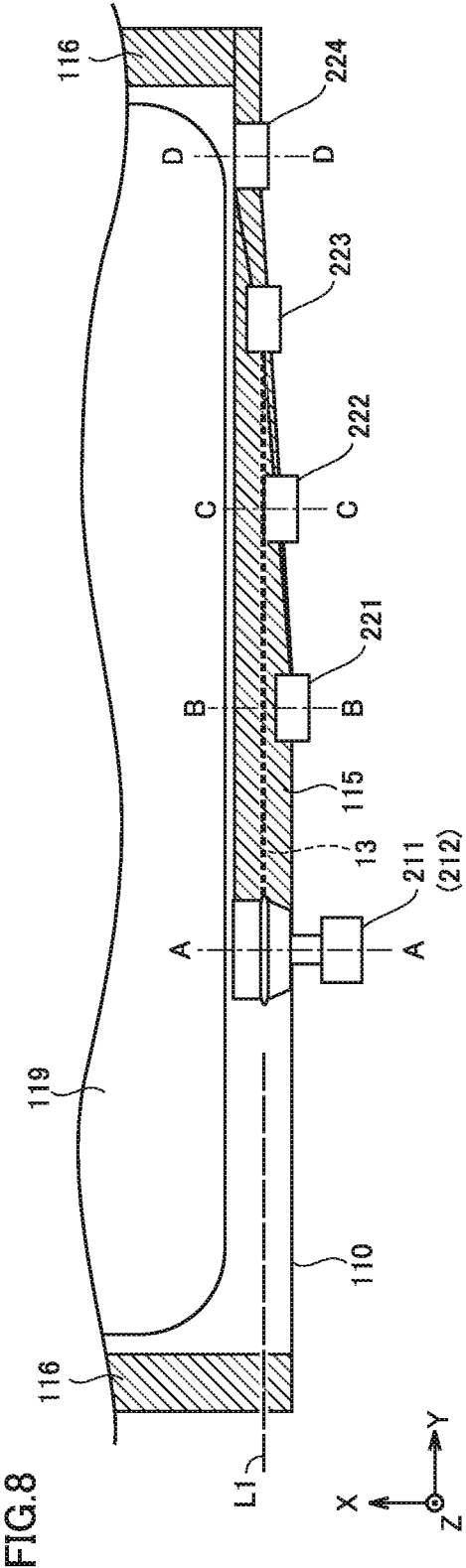
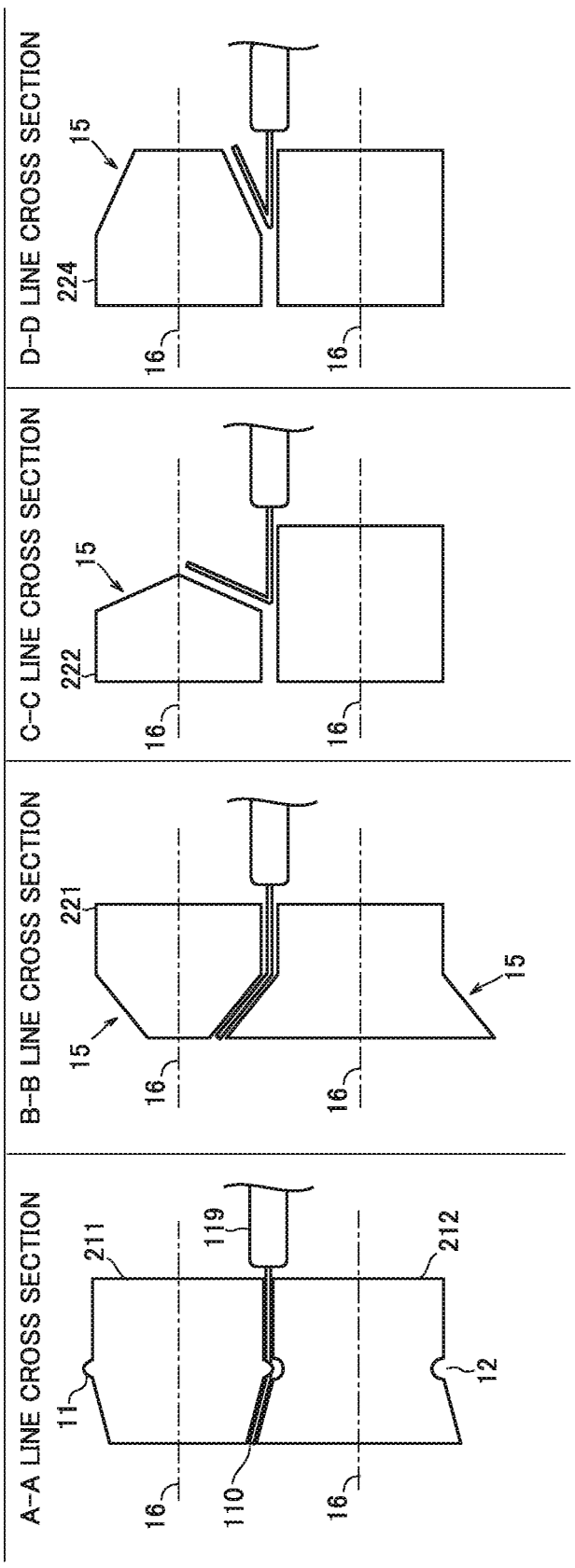

FIG.9
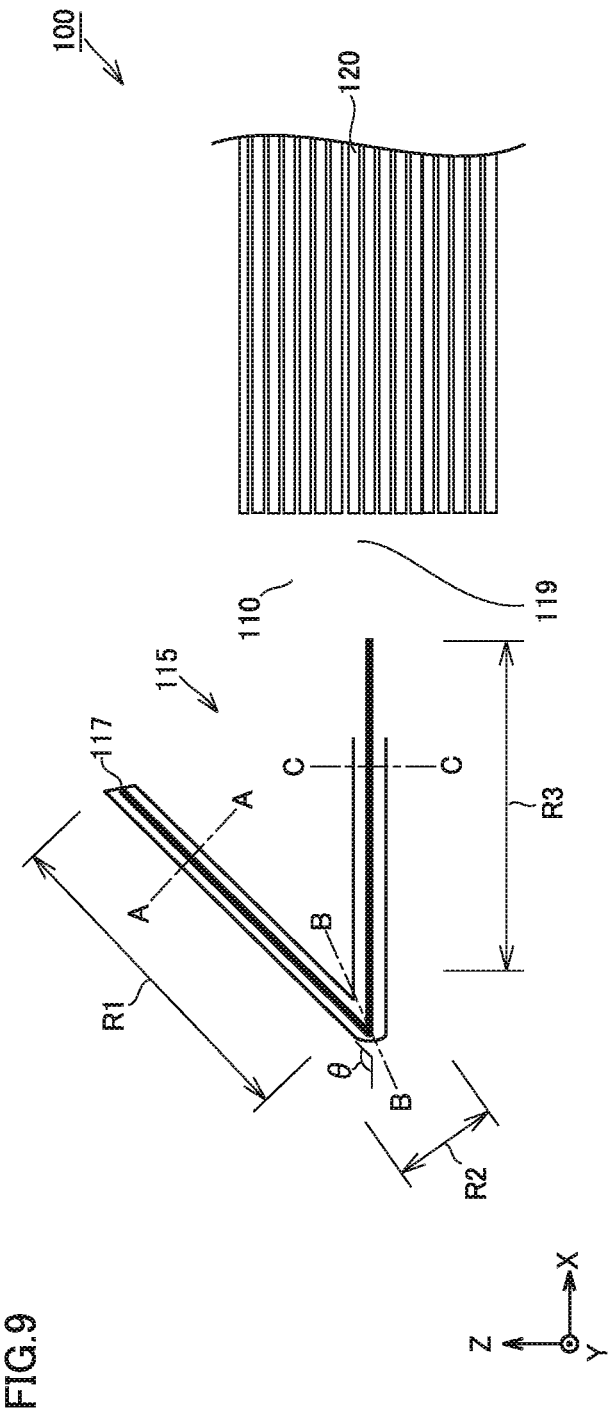
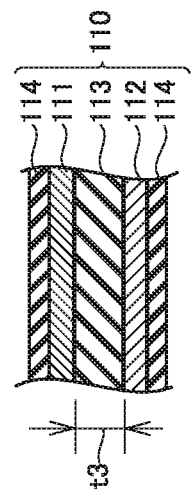
C-C LINE CROSS SECTION
t3 < t2
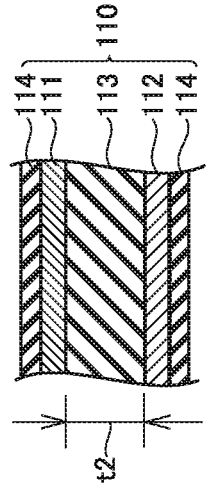
B-B LINE CROSS SECTION
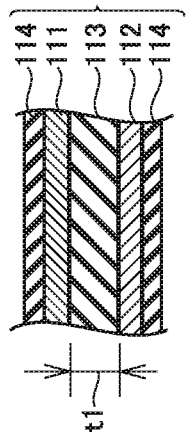
A-A LINE CROSS SECTION
t1 < t2

BATTERY PRODUCTION METHOD, BATTERY PRODUCTION APPARATUS, AND BATTERY

CROSS REFERENCE TO RELATED APPLICATIONS

This nonprovisional application claims priority to Japanese Patent Application No. 2021-169422 filed on Oct. 15, 2021, with the Japan Patent Office, the entire contents of which are hereby incorporated by reference.

BACKGROUND

Field

The present disclosure relates to a battery production method, a battery production apparatus, and a battery.

Description of the Background Art

Japanese Patent Laying-Open No. 2007-200589 discloses to fold a sealed portion at a peripheral edge of a laminate-type battery.

SUMMARY

A laminate film is used as a casing of a battery. Such a casing composed of a laminate film is referred to as a "laminated casing". A battery including the laminated casing is referred to as a "laminate-type battery".

For example, an electrode assembly (power generation element) is accommodated in the laminated casing. At the peripheral edge of the laminated casing, the laminated casing is welded, thereby forming a sealed portion.

In view of airtightness of the battery, the width of the sealed portion is desirably large. However, the sealed portion does not contribute to a battery capacity. In view of volume energy density of the battery, the width of the sealed portion is desirably small.

In order to reduce the width of the sealed portion while maintaining the airtightness, it is considered to fold the sealed portion, for example. However, in order to stably fold the sealed portion, it is required to form a bending tendency portion (folding line or the like) at the sealed portion in advance. In view of the number of steps, there is room for improvement in productivity.

It is an object of the present disclosure to improve productivity.

Hereinafter, the technical configurations, functions and effects of the present disclosure will be described. However, a mechanism of function in the present specification include presumption. The mechanism of function does not limit the technical scope of the present disclosure.

1. A battery production method includes the following (a) to (c).
   (a) An electrode assembly is accommodated in a laminated casing.
   (b) A pressure-applied portion is formed by sandwiching at least a portion of a peripheral edge of the laminated casing between a first tool and a second tool.
   (c) A sealed portion is formed by applying ultrasonic vibration from at least one of the first tool and the second tool to the pressure-applied portion.

The first tool includes a projection portion. The second tool is provided with a groove portion. A bending tendency portion is formed in the laminated casing by sandwiching the laminated casing between a tip of the projection portion and a bottom portion of the groove portion. The laminated casing is welded on both sides across the bending tendency portion.

Generally, in ultrasonic welding, a pair of ultrasonic welding tools are used. For example, the ultrasonic welding tools can include: a group of a horn and an anvil; or a group of a horn and a horn.

In the present disclosure, the pair of ultrasonic welding tools (the first tool and the second tool) has fitting structures. That is, the first tool includes the projection portion and the second tool is provided with the groove portion. During the ultrasonic welding of the laminated casing, a portion of the laminated casing can be sandwiched between the tip of the projection portion and the bottom portion of the groove portion, thereby forming the bending tendency portion. By applying ultrasonic vibration to the bending tendency portion, a tendency toward bending can be established. Further, the laminated casing is welded on both sides across the bending tendency portion with respect to the bending tendency portion. In this way, the sealed portion is formed.

In the present disclosure, the formation of the sealed portion and the formation of the bending tendency portion can be performed simultaneously in parallel. Therefore, productivity is expected to be improved. It should be noted that the laminated casing may or may not be welded at the bending tendency portion. Desired airtightness is expected to be obtained at the sealed portion on the both sides across the bending tendency portion.

2. A group of the first tool and the second tool may include a first region, a second region, and a third region. The second region includes the projection portion and is provided with the groove portion. The second region is disposed between the first region and the third region. When forming the sealed portion, the third region is close to the electrode assembly with respect to the first region. In a state in which the projection portion is fitted in the groove portion, a larger clearance may be formed in the second region than in each of the first region and the third region. The clearance represents a space between the first tool and the second tool.

Since the clearance between the projection portion and the groove portion is larger than the clearance in each of the other regions, a resin can be introduced between the projection portion and the groove portion during ultrasonic vibration, for example. Thus, the tendency toward bending is expected to be more likely to be established.

3. In the first region, a facing portion at which the first tool and the second tool face each other may be inclined with respect to a direction away from the second region.

In the first region, each of the first tool and the second tool may have a tapered shape. Thus, the laminated casing is expected to be warped in the first region. Since the laminated casing on the outer side with respect to the bending tendency portion is warped, a subsequent folding operation is expected to proceed smoothly, for example.

4. Each of the first tool and the second tool may be in a form of a disk. Each of the projection portion and the groove portion may be formed continuously in a circumferential direction. The ultrasonic vibration may be applied with the first tool and the second tool being rotated.

For example, the ultrasonic welding and the provision of the tendency toward bending may be performed in accordance with a rotary method. With the rotary method, it is expected to improve productivity, for example.

5. The battery production method may further include the following (d).

(d) The laminated casing is folded with the bending tendency portion serving as a folding line.

The folded shape is expected to be stabilized with the bending tendency portion serving as a folding line. The laminated casing may be folded up.

6. When forming the sealed portion, an amplitude of at least one of the first tool and the second tool may be smaller than twice a thickness of the laminated casing.

Since the amplitude of the horn is smaller than twice the thickness of the laminated casing (laminate film), damage to the laminate film due to ultrasonic vibration can be reduced.

7. A battery production apparatus can form a sealed portion at a peripheral edge of a laminated casing in which an electrode assembly is accommodated. The battery production apparatus includes a first tool, a second tool, a pressure applying apparatus, and an ultrasonic wave generating apparatus. The first tool and the second tool are configured to sandwich at least a portion of the peripheral edge of the laminated casing between the first tool and the second tool. The pressure applying apparatus is configured to apply pressure applying force to at least one of the first tool and the second tool. The ultrasonic wave generating apparatus is configured to apply ultrasonic vibration to at least one of the first tool and the second tool.

The first tool includes a projection portion. The second tool is provided with a groove portion.

The battery production apparatus is configured to form a bending tendency portion in the laminated casing by sandwiching the laminated casing between a tip of the projection portion and a bottom portion of the groove portion.

The battery production apparatus is configured to weld the laminated casing on both sides across the bending tendency portion.

In the battery production apparatus of "7", the battery production method of "1" can be performed.

8. A group of the first tool and the second tool may include a first region, a second region, and a third region. The second region includes the projection portion and is provided with the groove portion. The second region is disposed between the first region and the third region. When forming the sealed portion, the third region is close to the electrode assembly with respect to the first region. In a state in which the projection portion is fitted in the groove portion, a larger clearance may be formed in the second region than in each of the first region and the third region. The clearance represents a space between the first tool and the second tool.

In the battery production apparatus of "8", the battery production method of "2" can be performed.

9. In the first region, a facing portion at which the first tool and the second tool face each other may be inclined with respect to a direction away from the projection portion.

In the battery production apparatus of "9", the battery production method of "3" can be performed.

10. Each of the first tool and the second tool may be in a form of a disk. Each of the projection portion and the groove portion may be formed continuously in a circumferential direction. The battery production apparatus may be configured to rotate the first tool and the second tool in the circumferential direction.

In the battery production apparatus of "10", the battery production method of "4" can be performed.

11. The battery production apparatus may further include a folding apparatus. The folding apparatus may include one or more rolls. Each of the one or more rolls may include a tapered portion. At the tapered portion, the diameter of the roll is gradually decreased toward an end portion of the roll in an axial direction. The laminated casing may be configured to be folded with the bending tendency portion serving as a folding line, by pressing the tapered portion against the laminated casing with the roll being rotated.

In the battery production apparatus of "11", the battery production method of "5" can be performed.

12. A battery includes: a laminated casing; and an electrode assembly. The laminated casing accommodates the electrode assembly. When viewed in a plan view, the laminated casing includes a sealed portion at at least a portion of a peripheral edge of the laminated casing. When viewed in a cross sectional view, the laminated casing includes a first metal layer, a resin layer, and a second metal layer. The resin layer is interposed between the first metal layer and the second metal layer.

The sealed portion includes a first region, a second region, and a third region. The first region includes an end surface of the sealed portion. The third region is connected to an inner wall of the laminated casing. The second region is disposed between the first region and the third region. The laminated casing is folded in the second region.

The resin layer has a first thickness in the first region, a second thickness in the second region, and a third thickness in the third region. The second thickness is larger than each of the first thickness and the third thickness.

The battery of "12" can be produced, for example, by the above-described production method of "2". The second region can include the bending tendency portion. For example, since the clearance between the tip of the projection portion and the bottom portion of the groove portion is larger than a clearance in each of the other portions, a resin can flow into the second region (bending tendency portion). As a result, a resin layer can be formed to be thick at the bending tendency portion. Since the resin layer at the bending tendency portion is thick, the tendency toward bending is expected to be more likely to be established, for example.

13. In the first region and the third region, the laminated casing is sealed. The second region may include a portion at which the laminated casing is not sealed.

For example, when the clearance between the tip of the projection portion and the bottom portion of the groove portion is larger than a clearance in each of the other portions, portions of the resin layer may not be welded to each other in the second region (bending tendency portion). With the first region and the third region, it is expected to attain desired airtightness.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a conceptual diagram showing exemplary ultrasonic processing apparatus and folding apparatus.

FIG. 9 is a schematic cross sectional view of the battery according to the present embodiment.

DETAILED DESCRIPTION

Definitions of Terms, Etc

Figure 1:
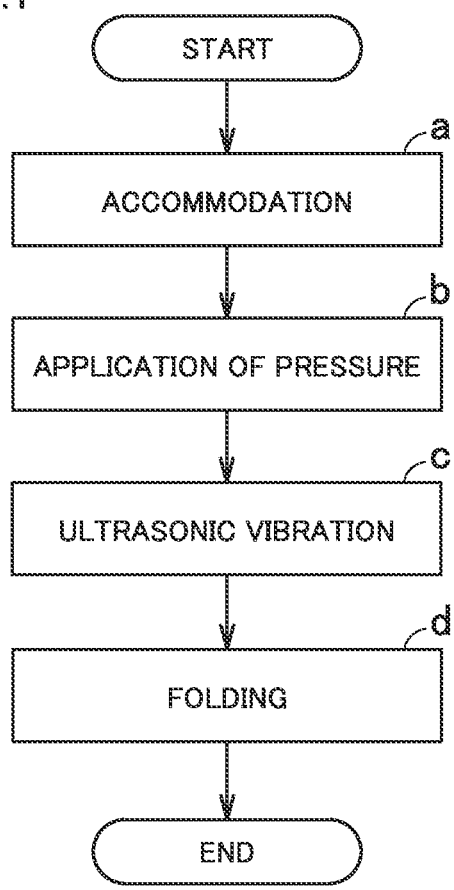
FIG. 1 is a schematic flowchart of a battery production method according to the present embodiment.

Hereinafter, an embodiment (hereinafter, simply referred to as "the present embodiment") of the present disclosure will be described. It should be noted that the present embodiment does not limit the technical scope of the present disclosure.

In the present specification, the terms "comprise", "include", and "have" as well as their variants (such as "be composed of") are open-end expressions. Each of the open-end expressions may or may not further include additional element(s). The expression "consist of" is a closed expression. It should be noted that even the closed expression does not exclude impurit(ies) that are involved in normal cases, as well as additional element(s) irrelevant to the technology of the present disclosure. The expression "consist essentially of" is a semi-closed expression. The semi-closed expression permits addition of element(s) that do not affect basic and novel characteristics of the technology of the present disclosure.

In the present specification, each of the words "may" and "can" is used in a permissible sense, i.e., "have a possibility to do", rather than in a mandatory sense, i.e., "must do". In the present specification, elements represented by singular forms may include plural forms as well, unless otherwise stated particularly.

In a method described in the present specification, an order of execution of a plurality of steps, operations, actions or the like is not limited to the described order unless otherwise stated particularly. For example, a plurality of steps may be performed simultaneously. For example, a plurality of steps may be performed earlier or later.

Geometric terms in the present specification (for example, the terms such as "parallel", "perpendicular", and "orthogonal") should not be interpreted in a strict sense. For example, the term "parallel" may be deviated to some extent from the strict definition of the term "parallel". The geometric terms in the present specification can surely include, for example, a tolerance, an error, and the like in terms of design, operation, manufacturing, and the like. A dimensional relation in each of the figures may not coincide with an actual dimensional relation. In order to facilitate understanding of the technology of the present disclosure, the dimensional relation (length, width, thickness, or the like) in each figure may be changed. Further, part of configurations may be omitted.

In the present specification, the expression "when viewed in a plan view" indicates to view an object (for example, a laminated casing, a battery, or the like) along a line of sight parallel to the thickness direction of the object. In the present specification, the expression "when viewed in a cross sectional view" indicates to view the object along a line of sight orthogonal to the thickness direction of the object.

In the present specification, a numerical range such as "m to n %" includes the lower and upper limit values unless otherwise stated particularly. That is, "m to n %" indicates a numeric value range of "more than or equal to m % and less than or equal to n %". Moreover, the expression "more than or equal to m % and less than or equal to n %" includes "more than m % and less than n %". Further, a numerical value freely selected from the numerical range may be employed as a new lower or upper limit value. For example, a new numerical range may be set by freely combining a numerical value described in the numerical range with a numerical value described in another portion of the present specification, table or figure.

In the present specification, all the numerical values are modified by the term "about". The term "about" can mean, for example, ±5%, ±3%, ±1%, or the like. All the numerical values are approximate values that can be changed depending on a manner of use of the technology of the present disclosure. All the numerical values can be indicated as significant figures. A measurement value can be an average value in multiple measurements. The number of measurements may be more than or equal to 3, more than or equal to 5, or more than or equal to 10. In general, as the number of measurements is larger, the reliability of the average value is expected to become higher. The measurement value can be rounded off based on the number of digits of the significant figure. The measurement value can include an error resulting from a detection limit of a measurement apparatus or the like.

The present embodiment can be applied to any battery system as long as a laminated casing is used. The present embodiment may be applied to, for example, a lithium ion battery or the like. The lithium ion battery may include a liquid electrolyte, a gel electrolyte, or a solid electrolyte. The present embodiment may be applied to, for example, a nickel-metal hydride battery or the like. The nickel-metal hydride battery may be of a bipolar type, for example.

In the present specification, the term "workpiece" represents an object to be processed (for example, a laminated casing, a laminate film, or the like) or a portion to be processed (for example, a portion of a laminated casing, a resin layer, or the like).

<Battery Production Method>

FIG. 1 is a schematic flowchart of a battery production method according to the present embodiment. Hereinafter, the expression "battery production method according to the present embodiment" can be simply referred to as "the present production method". The present production method includes "(a) accommodation", "(b) application of pressure", and "(c) ultrasonic vibration". The present production method may further include, for example, "(d) folding" or the like. It should be noted that the order in FIG. 1 is for the sake of convenience. For example, "(b) application of pressure" and "(c) ultrasonic vibration" may be performed substantially simultaneously.

<<(a) Accommodation>>

Figure 2:
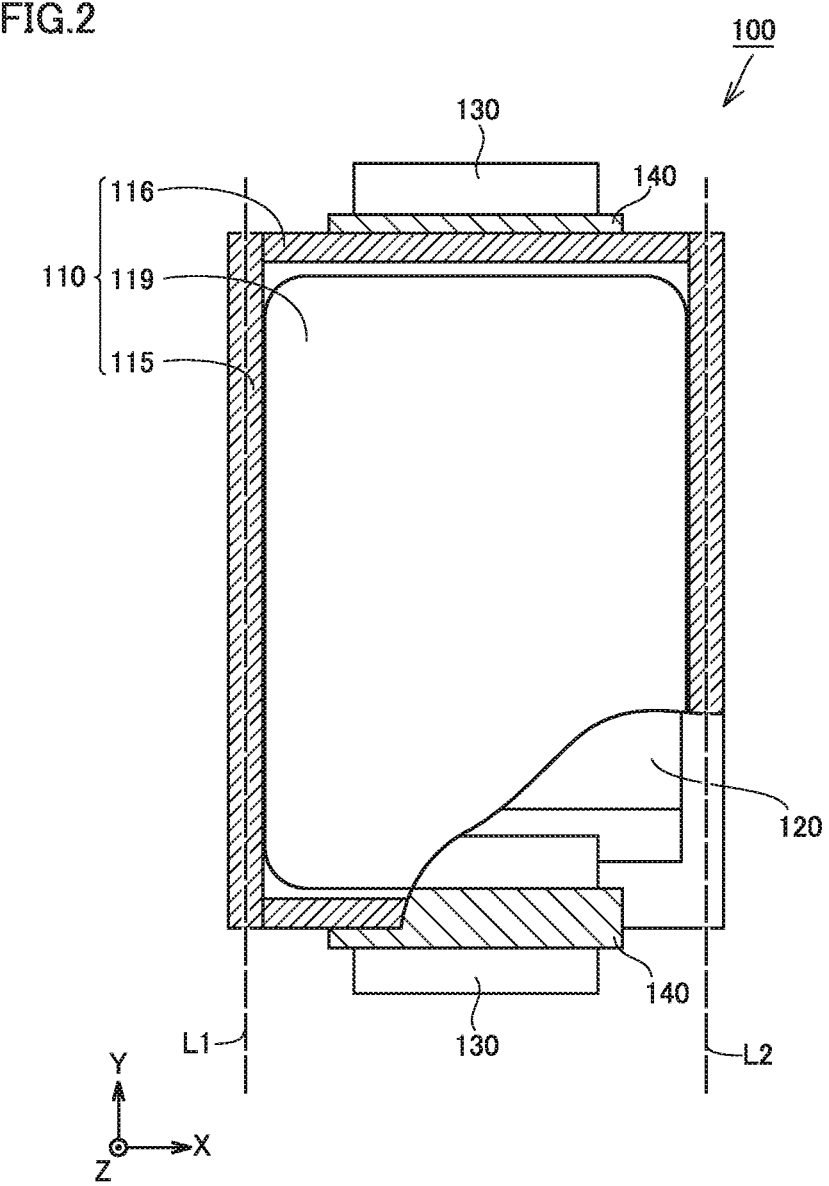
FIG. 2 is a schematic top view of a battery according to the present embodiment.

FIG. 2 is a schematic top view of the battery according to the present embodiment. Hereinafter, the expression "battery according to the present embodiment" can be simply referred to as "the present battery". The present production method includes accommodating an electrode assembly 120 in a laminated casing 110.

Laminated casing 110 includes a laminate film. Laminated casing 110 is in the form of a pouch. Laminated casing 110 may consist of one laminate film. Laminated casing 110 may include a plurality of laminate films.

Laminated casing 110 may include, for example, an accommodation portion 119. Accommodation portion 119 may be, for example, a recess in the form of a tray.

Accommodation portion 119 may extend along the outer shape of electrode assembly 120. Electrode assembly 120 is accommodated in accommodation portion 119. Further, for example, an electrolyte solution may be introduced into accommodation portion 119.

The portions of the laminate film are stacked on each other at the periphery edge of accommodation portion 119. The laminate film includes a resin layer. At the peripheral edge of accommodation portion 119, a contact surface between portions of the resin layer are formed.

<<(b) Application of Pressure>>

Figure 3:
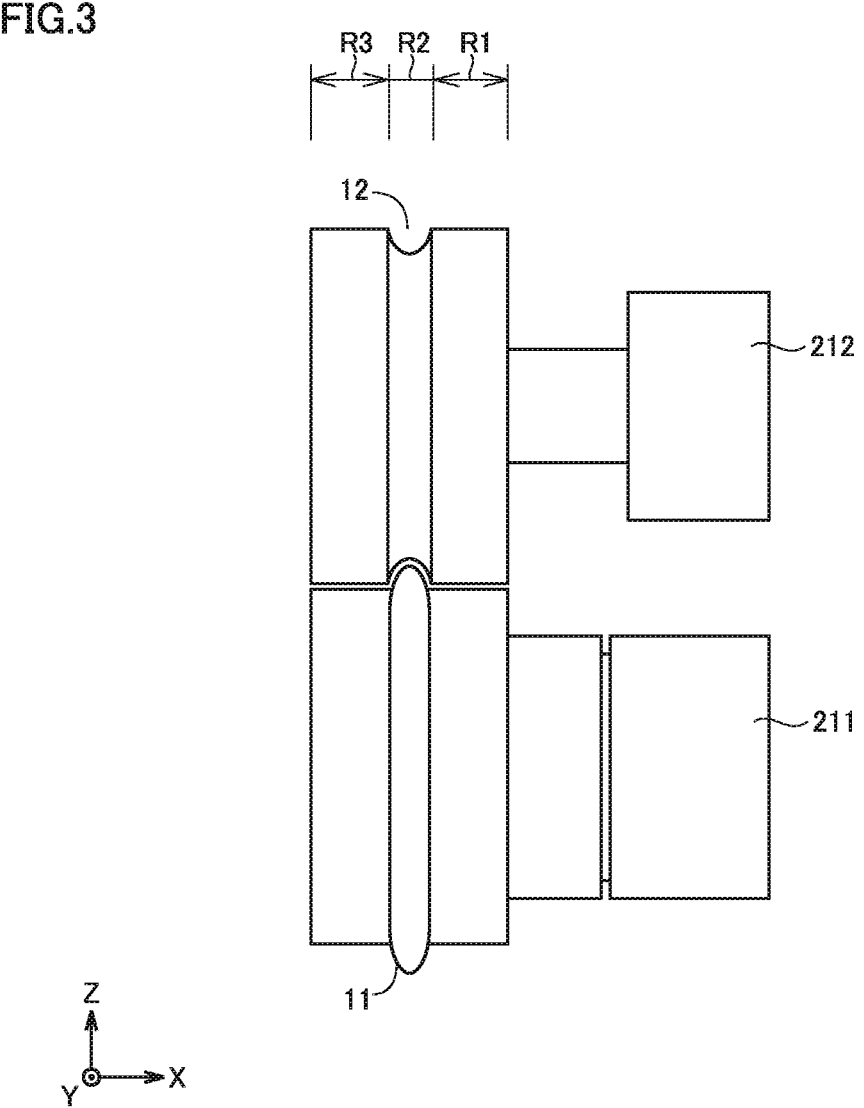
FIG. 3 is a first conceptual diagram showing an exemplary ultrasonic welding tool according to the present embodiment.

FIG. 3 is a first conceptual diagram showing an exemplary ultrasonic welding tool according to the present embodiment. The present production method includes forming a pressure-applied portion by sandwiching at least a portion of the peripheral edge of laminated casing 110 between a first tool 211 and a second tool 212.

The pressure-applied portion is formed on the contact surface between the portions of the resin layer. The pressure-applied portion represents a portion to which pressure is applied. The magnitude of the pressure may be appropriately adjusted to obtain a desired welding strength.

Each of first tool 211 and second tool 212 can transmit ultrasonic vibration to the workpiece. First tool 211 and second tool 212 can be so-called horns or anvils (receiving jigs). Each of first tool 211 and second tool 212 may be composed of, for example, an aluminum (Al) alloy, a titanium (Ti) alloy, or the like.

In the present production method, at least one of first tool 211 and second tool 212 is a horn. That is, first tool 211 or second tool 212 may be a horn. First tool 211 or second tool 212 may be an anvil. Both first tool 211 and second tool 212 may be horns.

Each of first tool 211 and second tool 212 may have any outer shape. Each of first tool 211 and second tool 212 may be in the form of a bar, for example. Each of first tool 211 and second tool 212 may extend straightly in the Y axis direction of FIG. 3, for example.

Figure 4:
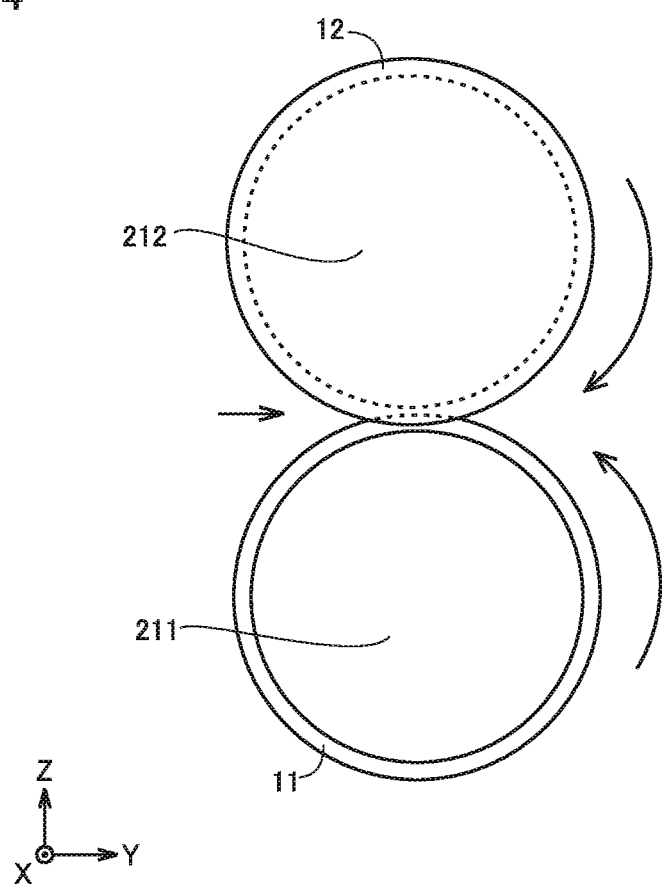
FIG. 4 is a second conceptual diagram showing an exemplary ultrasonic welding tool according to the present embodiment.

FIG. 4 is a second conceptual diagram showing an exemplary ultrasonic welding tool according to the present embodiment. Each of first tool 211 and second tool 212 may be in the form of a disk, for example. Since each of first tool 211 and second tool 212 is in the form of a disk, rotary type processing can be performed.

First tool 211 and second tool 212 have fitting structures. First tool 211 includes a projection portion 11. Second tool 212 is provided with a groove portion 12. Projection portion 11 and groove portion 12 have such shapes that they are fitted together. When each of first tool 211 and second tool 212 is in the form of a disk, each of projection portion 11 and groove portion 12 may be continuously formed in the circumferential direction (see FIG. 4).

Figure 5:
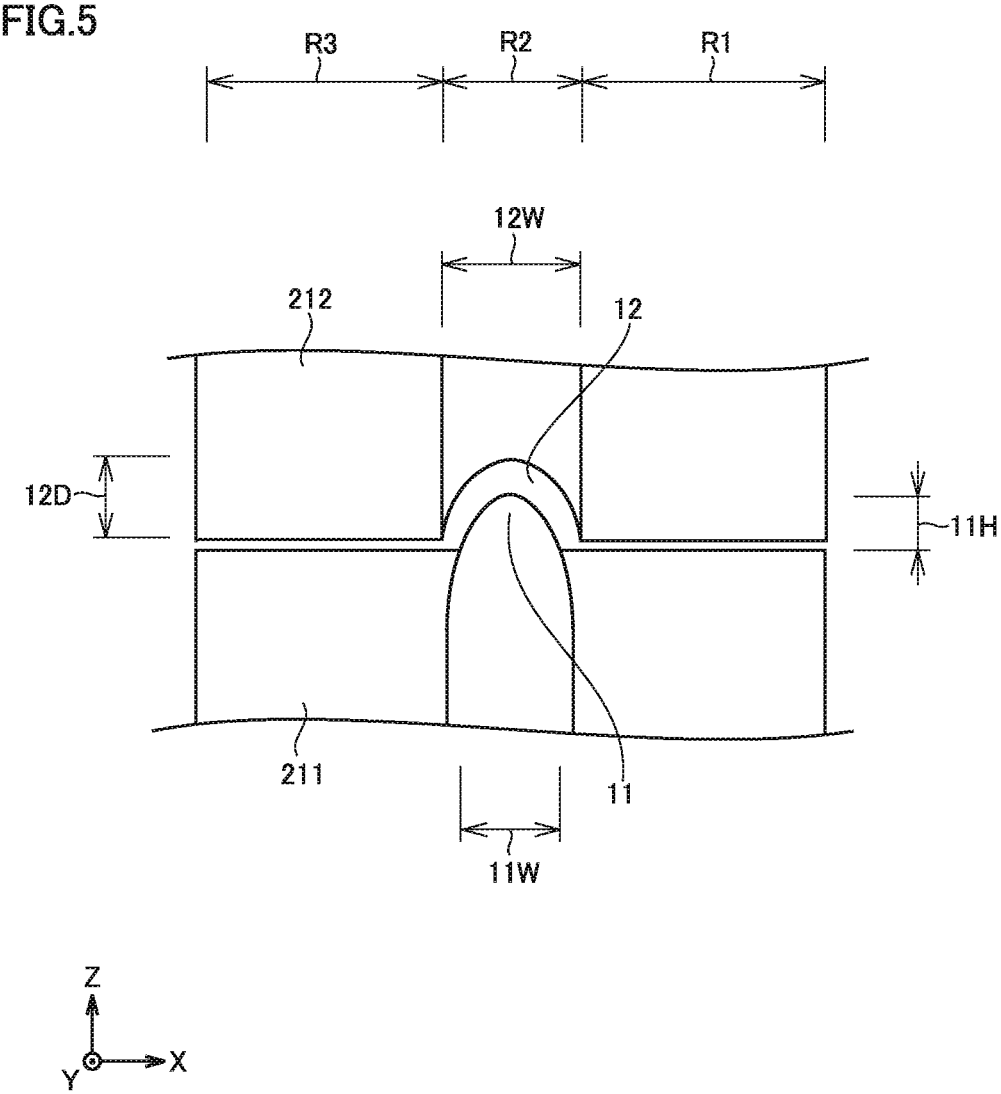
FIG. 5 is an enlarged view of a projection portion and a groove portion.

FIG. 5 is an enlarged view of the projection portion and the groove portion. The sizes of projection portion 11 and groove portion 12 can be appropriately set in accordance with the sizes of a bending tendency portion and a sealed portion. The width (11W) of projection portion 11 may be, for example, 0.5 to 5 mm. The width (12W) of groove portion 12 may be, for example, 0.5 to 5 mm. The height (11H) of projection portion 11 may be, for example, 0.5 to 2 mm. The depth (12D) of groove portion 12 may be, for example, 0.5 to 2 mm.

A workpiece is sandwiched between first tool 211 and second tool 212. Thus, a portion of the workpiece is sandwiched between the tip of projection portion 11 and the bottom portion of groove portion 12. Accordingly, the bending tendency portion is formed. When viewed in a plan view, the bending tendency portion may be formed in the form of a straight line, for example. For example, the bending tendency portion may be formed along a first straight line L1 and a second straight line L2 in FIG. 2.

Each of projection portion 11 and groove portion 12 may have any cross sectional shape. The cross sectional shape of each of projection portion 11 and groove portion 12 may be a quadrangular shape or U shape, for example. The cross sectional shape of projection portion 11 may or may not be similar to the cross sectional shape of groove portion 12. The tip of projection portion 11 and the bottom portion of groove portion 12 may be flat or curved. When the tip and the bottom portion are rounded, damage to the laminate film can be reduced, for example. Each of the tip and the bottom portion may be curved in the form of a circular arc or may be curved in the form of an elliptic arc, for example.

A group of first tool 211 and second tool 212 may include, for example, a first region R1, a second region R2, and a third region R3. First region R1, second region R2, and third region R3 are arranged side by side in the width direction of the sealed portion. The width direction of the sealed portion represents a direction from inside toward outside of the battery. In FIG. 5 or the like, the width direction of the sealed portion corresponds to the X axis direction. Third region R3 is close to electrode assembly 120 with respect to first region R1. Second region R2 is disposed between first region R1 and third region R3. Second region R2 may include projection portion 11 and may be provided with groove portion 12.

In a state in which projection portion 11 is fitted in groove portion 12, a larger clearance may be formed in second region R2 than in each of first region R1 and third region R3. The clearance in each of first region R1 and third region R3 may be substantially zero. The clearance in second region R2 may be, for example, 0.1 to 1 mm. Since the clearance of second region R2 is large, a resin can flow into second region R2 during ultrasonic vibration. A resin layer in second region R2 becomes thick, with the result that a tendency toward bending is expected to be more likely to be established, for example.

Figure 6:
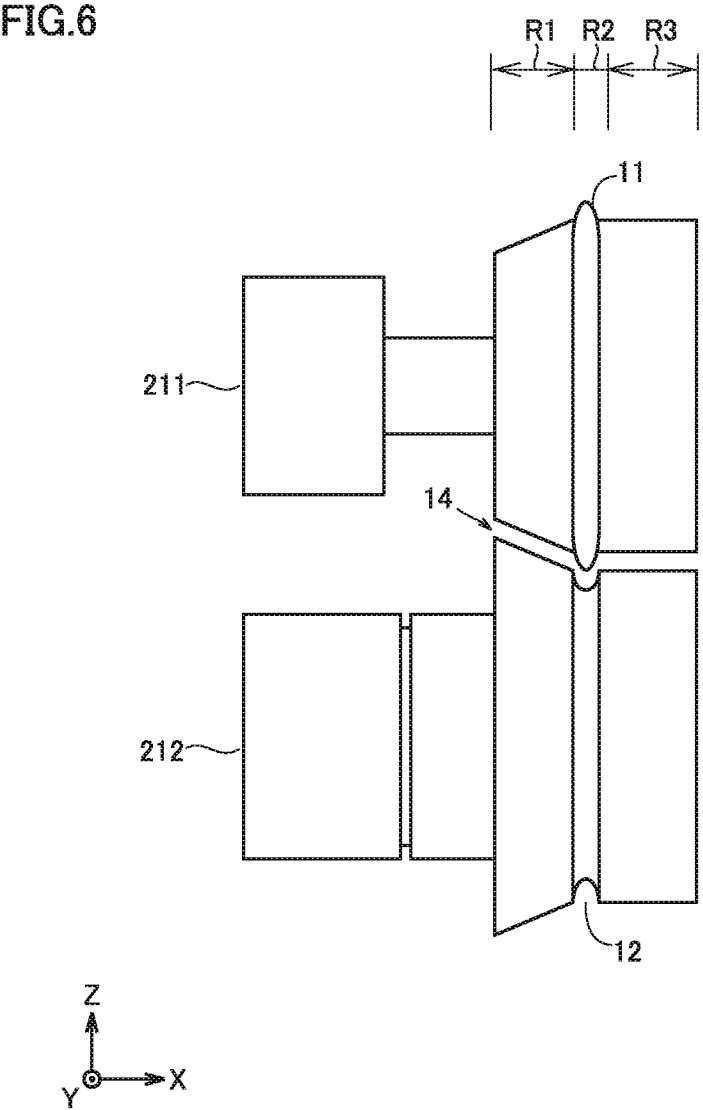
FIG. 6 is a third conceptual diagram showing an exemplary ultrasonic welding tool according to the present embodiment.

FIG. 6 is a third conceptual diagram showing an exemplary ultrasonic welding tool according to the present embodiment. For example, in first region R1, each of first tool 211 and second tool 212 may have a tapered shape. That is, in first region R1, a facing portion 14 at which first tool 211 and second tool 212 face each other may be inclined with respect to a direction away from second region R2. When the workpiece is sandwiched at facing portion 14 having the tapered shape, the workpiece is warped along facing portion 14. Since a portion of the workpiece is warped, a subsequent folding operation is expected to proceed smoothly, for example.

<<(c) Ultrasonic Vibration>>

The present production method includes forming a sealed portion by applying ultrasonic vibration from at least one of first tool 211 and second tool 212 to the pressure-applied portion. The sealed portion is formed at the peripheral edge of laminated casing 110, thereby producing the present battery 100. The sealed portion may be formed on the entire periphery or may be formed on a portion of the peripheral edge. For example, a method different from the present production method may be employed to form the sealed portion at portions corresponding to electrode tabs 130.

The vibration direction of the ultrasonic vibration may be parallel to the Z axis direction in FIG. 3 or the like, for example. One of first tool 211 and second tool 212 may be vibrated, or both first tool 211 and second tool 212 may be vibrated. When both first tool 211 and second tool 212 are vibrated, the vibration of second tool 212 may be synchronized with the vibration of first tool 211.

By applying ultrasonic vibration to second region R2, the tendency toward bending can be established at the bending tendency portion. Further, by applying ultrasonic vibration to first region R1 and third region R3, the resin layer can be welded. That is, laminated casing 110 can be welded on both sides across the bending tendency portion.

When each of first tool 211 and second tool 212 is in the form of a disk, ultrasonic vibration can be applied in accordance with a rotary method. That is, ultrasonic vibration is applied to the workpiece with first tool 211 and second tool 212 being rotated.

The amplitude of the ultrasonic vibration (the amplitude of at least one of first tool 211 and second tool 212) may be set to be smaller than twice the thickness of laminated casing 110, for example. Thus, damage to laminated casing 110 can be reduced, for example. For example, the amplitude of the ultrasonic vibration may be set to 0.5 to 1.8 times or 1 to 1.5 times as large as the thickness of laminated casing 110.

<<(d) Folding>>

The present production method may include, for example, folding laminated casing 110 with the bending tendency portion serving as a folding line. Since the bending tendency portion serves as a folding line, the folded shape is expected to be stabilized. Laminated casing 110 can be folded by any method. For example, a tapered roll or the like may be used. The folding operation may be performed, for example, in a single step or in multiple steps. For example, by stepwisely folding laminated casing 110, the folded shape is expected to be stabilized.

Laminated casing 110 may be folded by, for example, 90° or more, may be folded by 135° or more, or may be folded by 180°. The folding angle represents an exterior angle between the main surface of the present battery 100 and the folded-back surface thereof (see "θ" in FIG. 9). The main surface represents a surface having the largest area among the outer surfaces of the present battery 100.

In the case where the present battery 100 has a quadrangular shape when viewed in a plan view, laminated casing 110 is folded on one or more sides (see FIG. 2). For example, laminated casing 110 may be folded along first straight line L1 in FIG. 2. Further, laminated casing 110 may be folded along second straight line L2.

<Battery Production Apparatus>

Figure 7:
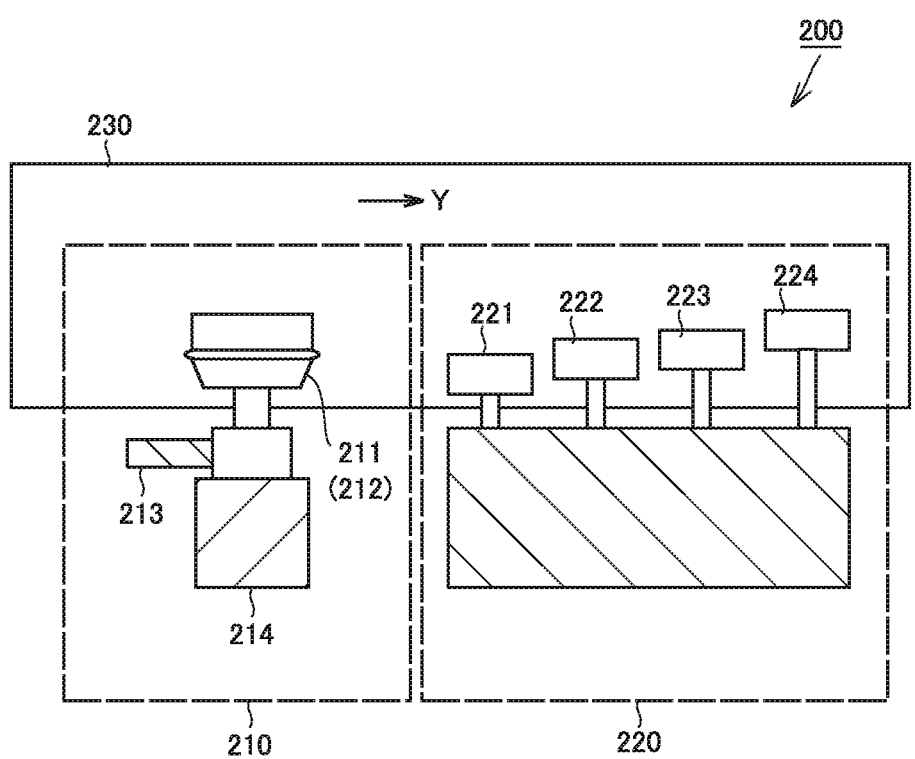
FIG. 7 is a conceptual diagram showing a battery production apparatus according to the present embodiment.

FIG. 7 is a conceptual diagram showing a battery production apparatus according to the present embodiment. Hereinafter, the "battery production apparatus according to the present embodiment" can be simply referred to as "the present production apparatus". The present production apparatus 200 includes an ultrasonic processing apparatus 210. The present production apparatus 200 may further include, for example, a folding apparatus 220 or the like.

In the present production apparatus 200, the present production method can be performed. That is, the present production apparatus 200 can form the sealed portion at the peripheral edge of laminated casing 110 in which electrode assembly 120 is accommodated. Production apparatus 200 can perform the operations from the sealing of the workpiece to the folding with a small number of steps. The Y axis direction in FIG. 7 indicates a conveying direction of the workpiece. First, ultrasonic processing apparatus 210 can simultaneously form the sealed portion and the bending tendency portion. Next, folding apparatus 220 folds the workpiece along the bending tendency portion. For example, by placing folding apparatus 220 immediately after ultrasonic processing apparatus 210, the apparatus size can be compact.

The present production apparatus 200 may further include, for example, a conveying apparatus 230, a controller (not shown), and the like. Conveying apparatus 230 may convey the workpiece. Conveying apparatus 230 may include, for example, a belt conveyor or the like. The controller may control individual operation, cooperation, and the like of each apparatus, for example.

<<Ultrasonic Processing Apparatus>>

Ultrasonic processing apparatus 210 includes first tool 211, second tool 212, a pressure applying apparatus 213, and an ultrasonic wave generating apparatus 214. That is, the present production apparatus 200 includes first tool 211, second tool 212, pressure applying apparatus 213, and ultrasonic wave generating apparatus 214. Ultrasonic processing apparatus 210 may further include, for example, a stage (not shown), a driving apparatus (not shown), and the like. The stage can support the workpiece, for example. The stage may include a plate composed of a metal, or the like. For example, the driving apparatus may drive at least one of first tool 211 and second tool 212 to travel straightly. For example, when each of first tool 211 and second tool 212 is in the form of a disk, the driving apparatus may drive to rotate at least one of first tool 211 and second tool 212.

First tool 211 and second tool 212 are attached to ultrasonic wave generating apparatus 214. First tool 211 and second tool 212 may be replaceable. Details of first tool 211 and second tool 212 are as described above. In ultrasonic processing apparatus 210, a positional relation between first tool 211 and second tool 212 is arbitrary. First tool 211 and second tool 212 may be adjacent to each other in the vertical direction or may be adjacent to each other in the horizontal direction, for example. A positional relation between first tool 211 and second tool 212 in the vertical direction is also arbitrary. First tool 211 may be located above second tool 212 in the vertical direction, or vice versa.

Pressure applying apparatus 213 applies pressure applying force to at least one of first tool 211 and second tool 212. Pressure applying apparatus 213 can apply pressure applying force by any method. Pressure applying apparatus 213 may include, for example, an air cylinder, an actuator, a servo motor, and the like.

Ultrasonic wave generating apparatus 214 applies ultrasonic vibration to at least one of first tool 211 and second tool 212. Ultrasonic wave generating apparatus 214 may include, for example, an oscillator, a vibrator, a booster, and the like. The oscillator can generate high-frequency power. The vibrator can convert the high-frequency power into ultrasonic vibration. The booster can adjust the amplitude of the ultrasonic vibration. The booster can transmit the ultrasonic vibration to at least one of first tool 211 and second tool 212.

First tool 211 includes projection portion 11. Second tool 212 is provided with groove portion 12. Ultrasonic processing apparatus 210 can form the bending tendency portion in laminated casing 110 by sandwiching laminated casing 110 between the tip of projection portion 11 and the bottom portion of groove portion 12. Further, ultrasonic processing apparatus 210 can weld laminated casing 110 on both sides across the bending tendency portion. The workpiece processed by ultrasonic processing apparatus 210 can be conveyed to folding apparatus 220 by conveying apparatus 230.

<<Folding Apparatus>>

Folding apparatus 220 can fold the workpiece by any method. Folding apparatus 220 can fold the workpiece by roll processing, for example. That is, folding apparatus 220 may include, for example, one or more rolls. Folding apparatus 220 may include, for example, a plurality of rolls. The workpiece may be folded stepwisely by the plurality of rolls. Folding apparatus 220 may include, for example, 1 to 10 rolls.

FIG. 8 is a conceptual diagram showing exemplary ultrasonic processing apparatus and folding apparatus. Folding apparatus 220 may include, for example, a first roll pair 221, a second roll pair 222, a third roll pair 223, and a fourth roll pair 224. The roll pairs are arranged side by side in the conveying direction (Y axis direction) of the workpiece. Each of the roll pairs can be rotated about a rotation axis 16. Each of the roll pairs includes at least one tapered roll. The tapered roll includes a tapered portion 15. At tapered portion 15, the diameter of the roll is gradually decreased toward the end portion of the roll in the axial direction.

Since each of the roll pairs includes the tapered roll, the workpiece can be guided smoothly. Both the rolls of each of the roll pairs may be tapered rolls, or only one of the rolls of each of the roll pairs may be a tapered roll. The inclination direction and inclination angle of the tapered roll can be appropriately adjusted to gradually fold the workpiece, for example. When the roll pairs are sequentially pressed against the workpiece with each of the roll pairs being rotated, the workpiece is gradually folded back with bending tendency portion 13 serving as a folding line.

Further, since first region R1 of each of first tool 211 and second tool 212 has a tapered shape in ultrasonic processing apparatus 210 located upstream, the workpiece having been through the ultrasonic processing is warped (see facing portion 14 in FIG. 6). With the warping of the workpiece, the workpiece can be guided smoothly to first roll pair 221.

<Battery>

The present battery 100 is a laminate-type battery. The present battery 100 can be produced by the present production method. The present battery 100 can have, for example, a flat outer shape. The present battery 100 includes laminated casing 110 and electrode assembly 120 (see FIG. 2). The present battery 100 may further include, for example, electrode tabs 130, tab films 140, and the like.

<<Electrode Assembly>>

Electrode assembly 120 is a power generation element. Electrode assembly 120 includes a positive electrode and a negative electrode. Electrode assembly 120 may include a bipolar electrode. Each of the electrodes may be in the form of a sheet. Electrode assembly 120 may further include, for example, a separator, an electrolyte, and the like. Electrode assembly 120 can have any form. Electrode assembly 120 may be, for example, of a wound type or stacked type.

<<Laminated Casing>>

Laminated casing 110 accommodates electrode assembly 120. When viewed in a plan view (FIG. 2), laminated casing 110 includes a first sealed portion 115 and a second sealed portion 116 at the peripheral edge thereof. At first sealed portion 115, portions of the resin layer are welded to each other. First sealed portion 115 extends straightly. Second sealed portion 116 extends in a direction orthogonal to first sealed portion 115. Second sealed portion 116 crosses over electrode tab 130.

FIG. 9 is a schematic cross sectional view of the battery according to the present embodiment. When viewed in a cross sectional view, laminated casing 110 includes a first metal layer 111, a first resin layer 113, and a second metal layer 112. Laminated casing 110 may further include second resin layers 114. Laminated casing 110 may have a thickness of, for example, 50 to 500 μm as a whole.

First resin layer 113 is interposed between first metal layer 111 and second metal layer 112. First resin layer 113 is formed by welding two resin layers. Second resin layers 114 cover the surfaces of laminated casing 110. Each of first resin layer 113 and second resin layers 114 may independently include polypropylene (PP), polyethylene terephthalate (PET), or the like, for example. Second resin layer 114 may have a composition that is the same as or different from that of first resin layer 113. First resin layer 113 may have a thickness of, for example, 10 to 200 μm. Second resin layer 114 may have a thickness of, for example, 5 to 50 μm.

Each of first metal layer 111 and second metal layer 112 may include, for example, a metal foil or a metal vapor-deposited layer. Each of first metal layer 111 and second metal layer 112 may independently include Al, an Al alloy, or the like, for example. Each of first metal layer 111 and second metal layer 112 may independently have a thickness of, for example, 5 to 200 μm.

First sealed portion 115 includes first region R1, second region R2, and third region R3. Second region R2 is disposed between first region R1 and third region R3. First region R1 includes an end surface 117 of first sealed portion 115. Third region R3 is connected to the inner wall of laminated casing 110. Second region R2 includes the bending tendency portion. In the second region, laminated casing 110 is folded.

First resin layer 113 has a first thickness (t1) in first region R1. First resin layer 113 has a second thickness (t2) in second region R2. First resin layer 113 has a third thickness (t3) in third region R3. The second thickness (t2) is larger than each of the first thickness (t1) and the third thickness (t3). The first thickness (t1) may be the same as or different from the third thickness (t3). For example, the second thickness (t2) may be 1.05 to 2 times or 1.05 to 1.5 times as large as the first thickness (t1) or the third thickness (t3).

The total width (sealing width) of first region R1 and third region R3 may be, for example, 5 to 20 mm. Each of first region R1 and third region R3 may independently have a width of, for example, 2 to 10 mm. Second region R2 may have a width of, for example, 0.5 to 5 mm.

In each of first region R1 and third region R3, laminated casing 110 is sealed. In each of first region R1 and third region R3, first resin layer 113 can be a single layer. Second region R2 may include a portion at which laminated casing 110 is not sealed. For example, in second region R2, a portion of first resin layer 113 may be separated into two layers. At the portion at which first resin layer 113 is separated into two layers, it is considered that the resin layers are not sufficiently melted and merged to each other.

<<Electrode Tab>>

The present battery 100 may further include electrode tabs 130. Each of electrode tabs 130 is connected to electrode assembly 120 (a positive electrode or a negative electrode). Electrode tab 130 is led to the outside of laminated casing 110. Electrode tab 130 extends through second sealed portion 116. Electrode tab 130 may function as, for example, an external terminal. An external terminal, a bus bar, or the like may be connected to electrode tab 130. Electrode tab 130 may include, for example, a metal plate. Electrode tab 130 may include, for example, Al, nickel (Ni), copper (Cu), or the like.

In FIG. 2, two electrode tabs 130 (a positive electrode tab and a negative electrode tab) are led out from laminated casing 110 in opposite directions. For example, two electrode tabs 130 (the positive electrode tab and the negative electrode tab) may be led out from one side in the same direction.

<<Tab Film>>

The present battery 100 may further include tab films 140. Each of tab films 140 is interposed between electrode tab 130 and laminated casing 110. Tab film 140 may strengthen airtightness around electrode tab 130. Tab film 140 may include, for example, PP, PET, or the like.

<Additional Notes>

The present specification also supports ultrasonic welding tools of "13 to 15" as described below.

13. An ultrasonic welding tool attachable to an ultrasonic processing apparatus, the ultrasonic welding tool comprising:
 a first tool; and
 a second tool, wherein
  the first tool includes a projection portion,
  the second tool is provided with a groove portion, and
  the projection portion and the groove portion have fitting structures with which the projection portion and the groove portion are fitted together.

14. The ultrasonic welding tool according to "13", wherein
 in a state in which the projection portion and the groove portion are fitted together,
  a larger clearance is formed inside the groove portion than outside the groove portion, and
  the clearance represents a space between the first tool and the second tool.

15. The ultrasonic welding tool according to the above "13" or "14", wherein
 the first tool includes a first inclined portion adjacent to the projection portion, and
 the second tool includes a second inclined portion adjacent to the groove portion, and
 in a state in which the projection portion and the groove portion are fitted together, the first inclined portion faces the second inclined portion, and the first inclined portion is parallel to the second inclined portion.

The present embodiment is illustrative in all respects. This embodiment is not restrictive. The technical scope of the present disclosure includes any modifications within the scope and meaning equivalent to the terms of the claims. For example, it is initially expected to extract freely configurations from the present embodiment and combine them freely.

What is claimed is:

1. A battery production method, comprising:
 (a) accommodating an electrode assembly in a laminated casing;
 (b) forming a pressure-applied portion by sandwiching at least a portion of a peripheral edge of the laminated casing between a first tool and a second tool; and
 (c) forming a sealed portion by applying ultrasonic vibration from at least one of the first tool and the second tool to the pressure-applied portion, wherein
  the first tool includes a projection portion,
  the second tool is provided with a groove portion,
  a bending tendency portion is formed in the laminated casing by sandwiching the laminated casing between a tip of the projection portion and a bottom portion of the groove portion, and
  the laminated casing is welded on both sides across the bending tendency portion.

2. The battery production method according to claim 1, wherein
 a group of the first tool and the second tool includes a first region, a second region, and a third region,
 the second region includes the projection portion and is provided with the groove portion,
 the second region is disposed between the first region and the third region,
 when forming the sealed portion, the third region is close to the electrode assembly with respect to the first region, and
 in a state in which the projection portion is fitted in the groove portion,
  a larger clearance is formed in the second region than in each of the first region and the third region, and
  the clearance represents a space between the first tool and the second tool.

3. The battery production method according to claim 2, wherein in the first region, a facing portion at which the first tool and the second tool face each other is inclined with respect to a direction away from the second region.

4. The battery production method according to claim 1, wherein
 each of the first tool and the second tool is in a form of a disk,
 each of the projection portion and the groove portion is formed continuously in a circumferential direction, and
 the ultrasonic vibration is applied with the first tool and the second tool being rotated.

5. The battery production method according to claim 1, further comprising (d) folding the laminated casing with the bending tendency portion serving as a folding line.

6. The battery production method according to claim 1, wherein when forming the sealed portion, an amplitude of at least one of the first tool and the second tool is smaller than twice a thickness of the laminated casing.

* * * * *